Figure 1:
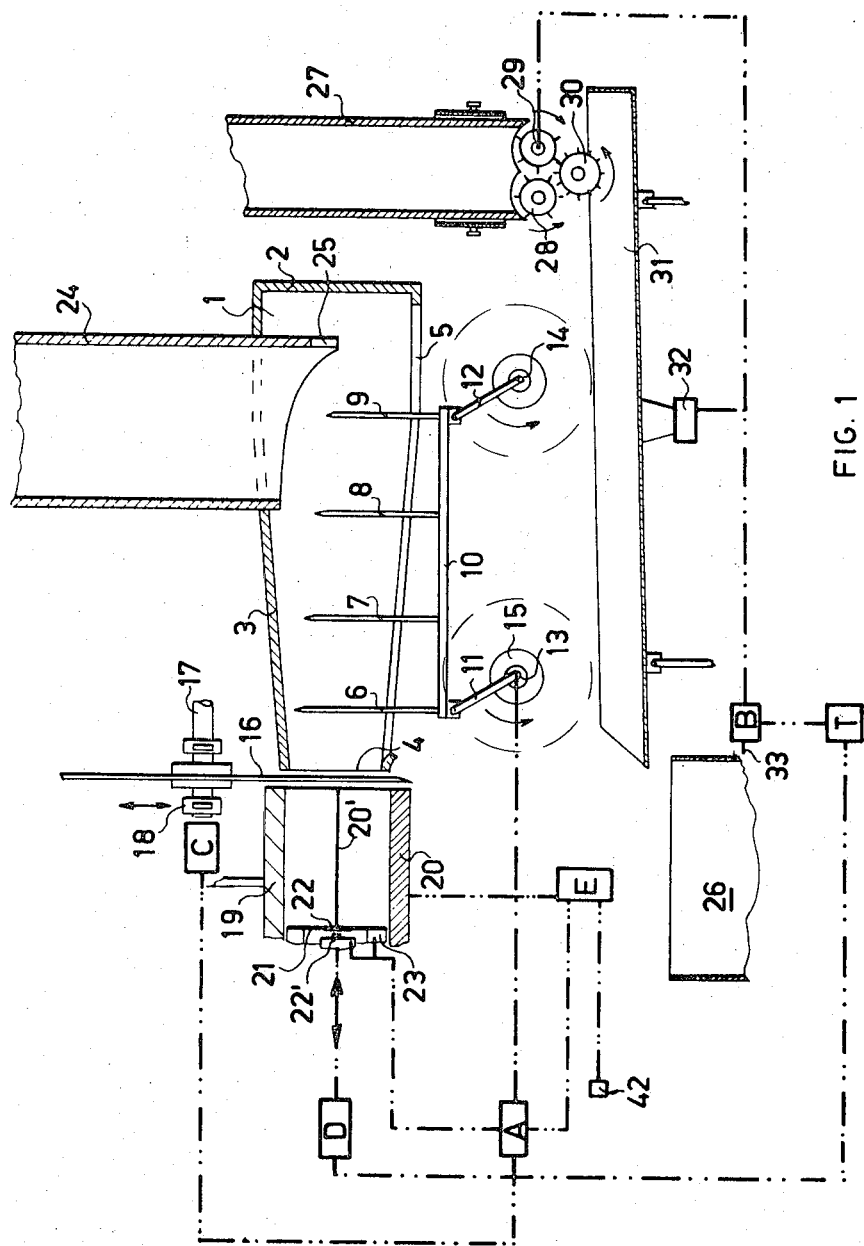

United States Patent

[11] 3,561,552

[72] Inventor Robert L. M. Rischke
Quintuslaan 18, Groningen, Netherlands
[21] Appl. No. 785,593
[22] Filed Dec. 20, 1968
[45] Patented Feb. 9, 1971
[32] Priority Feb. 6, 1968
[33] Netherlands
[31] 68.01680

[54] PROCESS AND DEVICE FOR MEASURING OUT TOBACCO
7 Claims, 3 Drawing Figs.

[52] U.S. Cl............................................. 177/120, 222/56
[51] Int. Cl............................................. G01g 13/02
[50] Field of Search.................................. 177/119, 120, 122, 123; 222/56, 80, 460; 310/(Inquired)

[56] References Cited
UNITED STATES PATENTS

| | | | |
|---|---|---|---|
| 3,134,449 | 5/1964 | Coffaro et al. | 177/123X |
| 3,135,343 | 6/1964 | Stambera | 177/122X |
| 3,209,844 | 10/1965 | Stambera et al. | 177/123X |
| 3,404,742 | 10/1968 | Bonneric | 177/122X |

FOREIGN PATENTS

| | | | |
|---|---|---|---|
| 654,056 | 6/1951 | Great Britain | 177/123 |

Primary Examiner—Richard B. Wilkinson
Assistant Examiner—George H. Miller, Jr.
Attorney—Otto John Munz

ABSTRACT: A type of tobacco strand identified as the cut variety is conveyed and compressed by a frustum shaped automatic conveyor system. A pressure sensor activated by virtue of the compressed cut tobacco energizes a rotary knife to cut off a desired volumetric quantity of the cut tobacco. Another type of tobacco identified as the short variety is conveyed by a second automatic conveyor system. The two types of tobacco are commingled on a common weighing mechanism to produce a predetermined quantity by weight of a mixed variety.

INVENTOR
ROBERT L. M. KISCHKE
BY Otto John Munz.

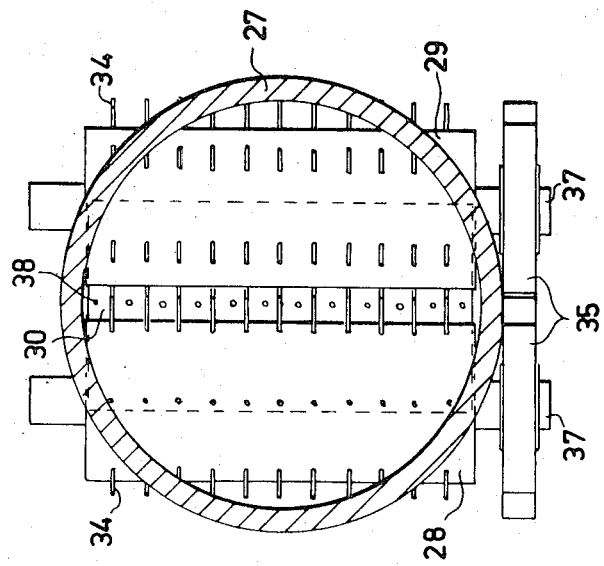
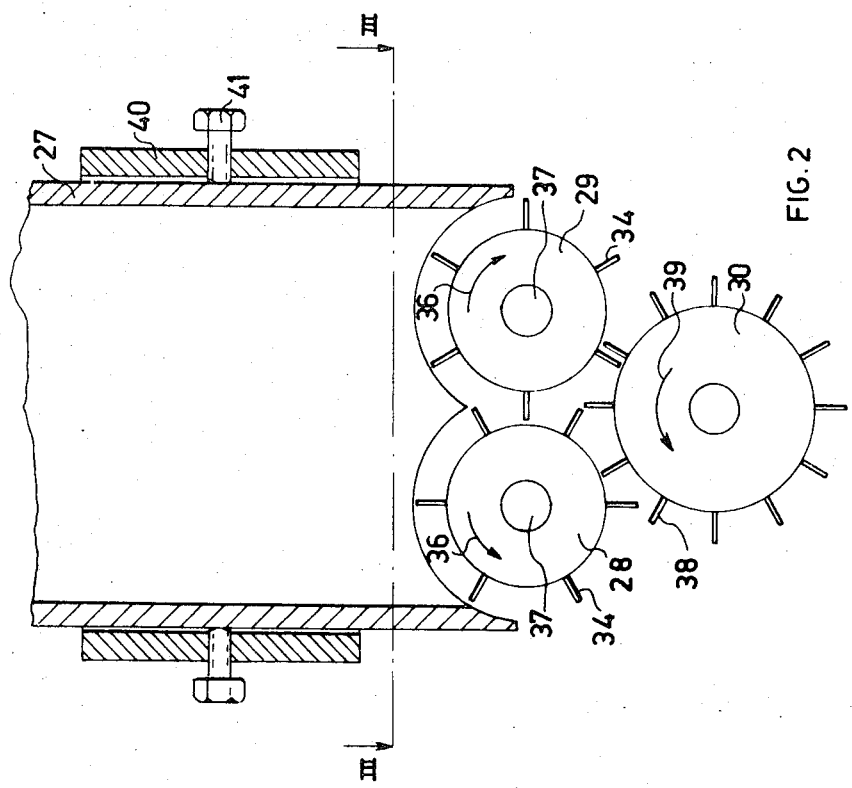

3,561,552

PROCESS AND DEVICE FOR MEASURING OUT TOBACCO

The invention relates to a process and device for measuring out a desired weight quantity of tobacco by means of determination of the volume.

Such a process and device, suitable for American pipe tobacco, has already been proposed.

American pipe tobacco, however, is relatively hard and granular. This causes the measuring out of a predetermined volumetric quantity, which in good approximation corresponds to the predetermined weight quantity to be a relatively easy procedure.

The invention has for an object to provide a process and a device for measuring out cut tobacco. Cut tobacco is identified as tobacco-leaves that have been cut into fine strips or "threads" (so-called shag). The weight of a volumetric quantity of this product substantially depends on the condition of the tobacco. Up to now no one has, as far as applicant knows, succeeded in designing a system to automatically measure out a predetermined weight quantity of tobacco, without affecting the structure of the cut tobacco.

The invention has for another object to provide a solution for this difficulty and provides a process and device, enabling the reliable measuring out of a predetermined weight quantity of cut tobacco in a completely mechanical way, without affecting the structure of the cut tobacco.

Another object according to the invention provides an arrangement whereby the cut tobacco is mechanically conveyed and compressed through a frustum shaped filler tube. Desired lengths of the tobacco strands are conveyed in the tube and are cut by a rotary knife when the landing edge of the strand activates a pressure sensor located external of the conveyor.

A further object of the invention provides that when mechanically conveying cut tobacco from the same stock of tobacco through the conveyor tube, the density of the tobacco in the conveyor tube remains substantially constant. By this the weights of the cut quantities are mutually equal within relatively small limits.

A further object of the invention provides that it is extremely favorable that the tobacco in the conveyor tube is compressed by letting the latter converge in the direction of conveyance. Preferably said convergence is such, that the wall of the tube with its centerline makes about an angle of 4 to 6°.

An advantage of the invention is, that it is not necessary therewith to compress the tobacco strongly. This would affect the tobacco and complicates the subsequent packing to a somewhat loose tobacco that is agreeable for the buyer.

The leading edge of the strand of tobacco leaving the tube does not have a completely flat shape. In order to find a correct criterion whether the tobacco has arrived at the adjusted location, it is provided according to a further elaboration of the invention, that at said location when the pressure exerted by the tobacco in the longitudinal direction of the conveyor tube exceeds a predetermined value, the strand or strands of tobacco are cut off.

An embodiment of the invention, that has appeared to be satisfactory in practice, consists in that the mechanical conveyance is carried out by a plurality of movably mounted pins protruding into the tube. The pins protrude into the tube and carry out a movement having a component in the longitudinal direction of the tube, within the tube and a withdrawal movement from the tube.

It has already been proposed to compensate deviations in the weight of a quantity of measured out tobacco by adding further tobacco until the correct weight has been reached. When applying the principle of this invention the quantity of further tobacco that is added, can be used as a means for adjusting the mentioned location, that has to be reached by the front side of the tobacco for cutting off the strand.

This, however, is not simply applicable, because it is not possible to regularly add normal cut tobacco in small quantities. It has appeared, however, that completion with so-called short tobacco, that is, cut tobacco with a small threadlength, is possible. Accordingly the measured out quantity of tobacco, according to a feature of the invention, is completed with short tobacco until the desired weight quantity has been obtained. However, the quality of the final product is affected if an excess of short tobacco is present in it. It is therefore, necessary that the quantity cutoff from the strand is constant within relatively narrow limits.

The adjustment of the measured out volume is, when applying the invention, advantageously effected by adjusting the said adjustable location. The way in which this takes place falls outside the scope of the invention. A suitable way consists in that the period of time, during which tobacco is added by the completing feeder until the volumetric measured out quantity has been completed to the correct weight, is determined. This period of time can be used to achieve the inventive concept to provide a work time for the completing feeder to measure a desired quantity for displacing the pressure sensitive member, and detecting the presence of the strand of tobacco at said location.

Another feature of the invention provides a system that includes a tobacco feeder and a mechanical measuring out device for the fed tobacco, which system is characterized by a conveyor tube for tobacco; driving means active in that tube for conveying the tobacco through the tube; a pressure sensitive member positioned opposite the outlet end of the tube, which pressure sensitive member controls the working of the driving means; and a cutting knife, movable along the outlet end of the tube.

Preferably the driving means consists of a set of pins that are movably mounted and a driving device, that is adapted to have the pins carrying out a path of movement, lying at least partly inside the tube and having in this part a component in the conveying direction.

The system for completing the cutoff quantity of tobacco, which, when applying the principle of the invention, also has to be suitable for working up a quantity of good quality short cut tobacco. According to a further elaboration of the invention, the system includes a supply tube for short tobacco, at the end of which drivable pin rolls are arranged. The axes of which are parallel to each other. Then a smooth working up of the short tobacco is obtained by a further conveying device, like a vibrating conveyor or a conveyor-belt. The quantity is added to the cutoff quantities of tobacco without obstruction or interruption of the operation. Preferably two pin rolls that are oppositely geared with each other mounted such that, when rotating the rolls, the pins of the rolls move in opposite directions from each other at the side facing the supply tube. At least one driven cleaning pin roll is utilized. The pins of which are mounted staggeredly with respect to those of said two pin rolls.

In addition to the foregoing described objects and advantages of the invention, additional objects and advantages will become apparent as the following detailed description of the invention is read in conjunction with the accompanying drawings which illustrate the invention, wherein:

FIG. 1 schematically and partly sectionally shows a device according to the invention;

FIG. 2 is a detail illustration of the supply tube and the pin-roll arrangement; and FIG. 3 is a section taken along line III–III of FIG. 2.

In the drawing 1 is a conveyor tube with a closed end wall 2, a conical portion or frustum 3 and an outlet end 4, which is open. At the lower side a continuous slot 5 has been arranged, into which pins 6, 7, 8 and 9 protrude, which pins are mounted to a support 10. Said support is supported by two crank arms 11 and 12 which are mounted on shafts 13 and 14, which are coupled with means (not shown), by which they can only rotate in the same direction and with the same velocity and of which one, e.g. 11, is driven by a driving means (not shown). Between these driving means (not shown) and the shaft 13 an electromagnetic coupling 15 has been arranged, which when excited immediately stops the shaft 13. Such couplings, which e.g. also contain an electromagnetic brake, are known in themselves and need no further description. Pins 6, 7, 8 and 9 have a decreasing length in the sequence as mentioned. It has appeared that this is favourable for obtaining a constant compactness of the strand of tobacco leaving the tube 1 at 4.

Immediately connected with the outlet end 4 of the tube 1 a rotating knife 16 has been mounted on a shaft 17, which is rotatably mounted in arms 18, which by means of a swing- or shift-mechanism (not shown) can be brought from the shown position into a position, in which the knife 16 completely releases the outlet opening 4. Beyond this knife a guide part (19) for the strand is present, which preferably has a circular section and the lower part 20 of which can be pivoted away about the line 20'. The parts 19 and 20 together determine a cylindrical space, which may have the same or a somewhat larger diameter than the outlet end 4 of tube 1.

At the left side the guide body 19 has been closed by a flexible membrane 21, bearing a contact 22, that, when pressure is exerted on the right side of the membrane, engages a counter contact 22'. The membrane has been stressed in a stress-device 23 (only schematically shown).

A feed tube 24 has been mounted to the filler tube 1 at the right side, by which cut tobacco, e.g. from a higher positioned floor can be supplied. The lower side of the tube 24 penetrates tube 1 in a considerable less degree at the outlet side than at the side of the closed wall 1. In the wall of the tube 24 a recess 25 has been arranged at the lower side for enabling the passage of pin 9.

Below the strand guide 19 a weighing device or mechanism 26 is present. A further supply tube 27 for short tobacco is also filled from the upper side by means (not shown) and is at its lower side provided with pin rolls 28, 29 and 30. Below said pin rolls a vibrator conveyor 31 is present, with as driving means the vibrator motor 32.

Furthermore a number of control devices have been mounted, which in themselves do not form part of the invention, because they are of types known in themselves. Operation transmitting couplings, like electric conductors, pneumatic conductors or mechanical connections, with which the several parts of FIG. 1 influence each other, have been indicated by lines interrupted by two dots.

The device A is an electric or electromechanical control device, that is controlled by the pair of contacts 22, 22'. When said pair of contacts is closed coupling 15 decouples, so that the pins 6—9 inclusive are stopped. Furthermore device A controls a driving device C for the arms 18, in which the shaft 17 of the knife 16 has rotatably been mounted, in order to allow said knife to move from an uppermost position, in which it completely releases the outlet end 4 of the tube 1 into the position shown and back again.

Automatic devices (not shown) which are known in themselves and do not form part of the invention, operate rolls 28, 29 and 30 and the vibrator 32, when the weighing device 26 contains a quantity of tobacco the weight of which lies under the desired weight.

The weighing device 26 is provided with a signalling device 33. Said device 33 operates a control device B, when the device 33 indicates that the weighing device 26 contains a weight smaller than the desired weight of the quantity of tobacco to be measured out.

As long as B has been operated the vibrator 32 has been excited and the pin rolls 28, 29 and 30 are driven. When the weighing device 26 contains the desired quantity of tobacco, the pin rolls 28, 29, 30 and 32 are stopped via B.

Furthermore a time measuring chain T has been arranged, which compares the time during which the vibrator 32 has worked with a fixed adjusted time period and controls an adjustment device, D, with which the support 23 of the membrane 21 can be displaced to the left and to the right in dependence on the duration of the working of the vibrator conveyor 32 and the pin rolls 28, 29 and 30 with respect to a desired duration of the working of said members.

The swing control device for the arms 18, indicated as C, can e.g. consist of a double acting electropneumatic valve, which on receipt of a control pulse from the device A carries out a downwardly directed and again upwardly swinging movement and then stops until the device A again gives a new impulse on the closing of the contacts 22 and 22'. A control device E for controlling the movement of guide part 20 can have the same construction as device C has. Device E is controlled by an external contact 42, which is operated in a way known in itself when the weighing device has discharged. E, after having swung away part 20 and back again, operates A for reexciting coupling 15.

As indicated in FIGS. 2 and 3 each pin roll of the pair of rolls 28 and 29 has six rows of eleven pins 34, which have a length such that they just can pass the other roll 28 or 29 with their ends. The rolls 28 and 29 are coupled with each other, e.g. by means of gears 35 and turn with their upper sides to the outside, as has been indicated with arrows 36. The pins 34 of the rolls are mounted in a plane perpendicular to the shafts 37 of the rolls 28 or 29 in such a way, that a pin 34 of the one roll always passes between two pins 34 of the other roll. Roll 30 has twelve rows of ten pins 38, which move just along the surfaces of the rolls 28 and 29. Pins 38 are staggered with respect to the pins 34 in an axial direction. Roll 30 is by means of gears (not shown) coupled with one of the gears 35 in such a way, that it (30) rotates in the direction of the arrow 39 with a number of revolutions that is about three times higher than that of the rolls 28 or 29. The lower end of the supply tube 27 has been cut off such, that the lower rim forms the section with the cylinders through the ends of the pins 34. The tube 27 is vertically shiftable in a permanent bearing 40 and can be fastened by means of screws 41. The quantity of short tobacco delivered per time unit during which the rolls rotate can be controlled by the vertical adjustment of the supply tube 27.

It has appeared, that the device as described works very satisfactory and especially cleans itself very well, so that no interruptions owing to accumulations of tobacco have to be feared. For proper operation in both the indicated directions of rotation, of rolls 28 and 29, the indicated arrangement of the pins has appeared to be very favourable.

In the operation of the device, cut tobacco is fed to the feed tube 24. The tobacco is moved to the left by the pins 6—9 inclusive, leaves the outlet side 4 as a strand and arrives into the strand guide 19 until the pair of contacts 22 and 22' is closed. Owing to this an impulse is fed to the control device A, by which first the coupling 15 is decoupled and the pins 6—9 inclusive are stopped and the knife 16, via the device C, is swung downwardly and again upwardly, so that the strand is cut off.

After this the device A activates a first input of device E. When the weighing device 26 is free contact 42 is closed and activates a second input of device E. When both its inputs are activated device E pivots support 20 away and the cutoff strand of tobacco falls into the weighing device 26. After the swing back of support 20 the device A is again excited by E and a new quantity of tobacco is brought into 19, 20 by the pins 6—9 inclusive. The tobacco that has fallen into the weighing device 26 owing to the swinging of 20 will, when it is smaller than the desired quantity of weight, operate the vibrator conveyor 32 and the rolls 28—30 via 33. Control device B controls the quantity of short tobacco that is supplied to the weighing device 26 until the latter again controls the device 33 and the rolls 28—30 and the vibrator are stopped via B. The time during which this takes place is measured by T and compared with a predetermined time, after which a corresponding impulse is fed to D, which operates an adjustment device, consisting of e.g. a servomotor and a nut and a threaded nut shaft.

The walls of the guide 19, 20 can have in the closed position of the lower part 20 a cross section, that is identical to the cross section of the outlet end 4 of the tube 1. It is also possible to select the cross section of the guide 19, 20 to be somewhat wider, as the strand of tobacco shows a relatively great coherence and the reduction of the friction between the strand and the guide 19, 20 is reduced. By this it is also possible to arrange one single flat support plate instead of a cylindrical guide 19, 20.

In the shown embodiment the conveyor tube 1 and the feed tube 24 have a circular cross section, but this is, though it is preferred, not always necessary. So e.g. either partly flattened or oval or even tubes having other cross section shapes can be used. Location and length of the pins, like 6—9 inclusive, then have to be adapted to the cross section shape. Especially it is pointed out, that it is not necessary to use only one row of pins 6—9 and that two or more rows of pins juxtapositioned can be used, with which for each row a slot can be arranged.

The opening into which the pins protrude, need not always be slot-shaped, as is slot 5. When e.g. the pins protrude into the conveyor tube from the upper side, a considerable part of the upper wall of the filler tube can be taken away for the passage of the pins. It is also possible that each pin has its own slot, e.g. when all the pins have not been mounted on one row of pins.

In the drawing an embodiment to scale has been shown for working up so-called heavy shag. Therewith the converging part 3 of the tube 1 has a length of 230 mm, the largest diameter being 100 mm and the smallest diameter 60 mm. Generally speaking the favorable conditions for cut tobacco and especially for shag tobacco in accordance herewith lie for the convergence angle of the tube with respect to the centerline in the neighborhood of 4 to 6°.

Pin 6 leaves the slot 5 at a short distance from the outlet end 4, namely a distance of 25 mm. Therewith pin 6 just brushes past the upper side of the inner wall of the converging part 3 of tube 1, while the pins 7, 8 and 9 are every time somewhat shorter and successively remain somewhat further away from the inner side of the tube part 3. In practice it has appeared that it is favourable to drive the tobacco as far as possible towards the outlet end 4 of the conveyor tube 1 by means of the pins and that a long tube portion beyond the driving pins will sooner lead to an irregular compression of the tobacco than to a regular compression, but on the other hand excellent results can be obtained under favourable conditions, when the driving of the pins 6—9 inclusive stops occur at a considerable distance from the end 4 of the conveyor tube 1.

With the described device one has succeeded in measuring out tobacco fully automatically, and the deviation between the measured out quantities were, after the device had run some time, within less than one gram. Further, with the use of the device of the present invention, no problem of compact packing of the tobacco is encountered as the tobacco is only slightly compressed in the operation.

I claim:

1. A method for measuring a desired weight quantity of tobacco by means of a determination of a volumetric quantity of tobacco, comprising the steps of:

preparing a quantity of cut variety tobacco strands for processing through a feed supply tube to a filler conveyor tube, the conveyor tube having a frustum configuration and having an inlet end and an outlet end of smaller cross-sectional area than said inlet end for compressing the cut tobacco strands, mechanically conveying the compressed cut tobacco strands through said conveyor tube toward said smaller outlet end, and the protruding compressed cut tobacco strands moving from the outlet end exerts a pressure on a pressure sensor arrangement for actuating a rotary knife to cut a desired volumetric quantity of the compressed cut tobacco strands.

2. A method according to claim 1, wherein the mechanical conveying step is performed by a plurality of movably mounted pins operatively arranged in an elongated slot of the filler tube.

3. A method according to claim 1, wherein the compressed cut tobacco strands are processed to a weighing mechanism positioned below said conveyor tube and the desired weight quantity of tobacco strands is achieved by means of including a desired quantity of additional tobacco of the short variety type to supplement the quantity of the compressed cut tobacco.

4. A device for measuring a desired weight quantity of tobacco by means of a determination of a volumetric quantity of tobacco, comprising a filler tube having an elongated slot and having an inlet end and an outlet end of smaller cross-sectional area than said inlet end;

a pressure sensor arrangement;

a conveyor operatively mounted within said elongated slot for conducting the tobacco strands through said filler tube;

means controlled by said pressure sensor arrangement for driving said conveyor;

said filler tube having a frustum configuration for compressing the tobacco strands toward said smaller outlet end; and a knife means movably mounted adjacent said outlet end and controlled by said pressure sensor arrangement for cutting a desired volumetric quantity of the tobacco strands.

5. A device according to claim 4, wherein said conveyor includes a plurality of pins of increasing height from said inlet end to said outlet end, and a movably mounted means associated with said pins for providing a rotary motion to said pins.

6. A device according to claim 4, includes a weighting mechanism positioned below said conveyor for receiving said cut variety tobacco strands and means associated with said weighing mechanism for supplying additional tobacco of the short variety type to complete a desired weight quantity of tobacco.

7. A device according to claim 6, wherein said means for supplying additional tobacco of the short type comprises a supply tube for containing a quantity of short tobacco, a vibrator conveyor for moving the short tobacco into said weighing mechanism, means associated with said supply tube and said vibrator conveyor and including a pin roll arrangement for supplying a desired quantity of short tobacco from said supply tube to said vibrator conveyor.